Patented May 8, 1934

1,957,908

UNITED STATES PATENT OFFICE 1,957,908

ESTERS OF CARVACROL AND THEIR PRODUCTION

Curt Philipp, Radebeul-Dresden, Germany, assignor to Chemische Fabrik von Heyden A. G., Radebeul-Dresden, Germany, a corporation of Germany No Drawing. Application March 8, 1930, Serial No. 434,443. In Germany June 8, 1928

8 Claims. (Cl. 260—104)

This invention relates to a method of making carvacrol derivatives, the object of the invention being to provide a method by which these products may be produced in a more direct way than possible up to now.

I have found that I may obtain valuable carvacrol compounds by engaging the hydroxyl-group of these compounds. This can be done for instance by its esterification with inorganic or organic acids, or by forming their ethers, or generally by causing the said group to react with compounds which are capable of substituting the hydrogen of the phenylhydroxyl-group thereby destroying the function of the phenol-group. For the better understanding of my invention I cite the following examples.

EXAMPLE I

Production of chlorcarvacrol-carbonate 184 parts of chlorcarvacrol are dissolved in 800 parts of a 5% sodiumhydroxide solution and while it is cooled, 50 parts of phosgene is introduced until the mixture shows a weak acid reaction. Very soon a thick oil segregates, which increases in quantity and gradually solidifies. After the end of the reaction the product is separated from the mother liquor and the chlorcarvacrol carbonate crystallizes out of dilute alcohol from which it is obtained in white crystals of m. p. 83–84° C.

EXAMPLE II

Production of the salicylic acid-chlorcarvacrol-ester

A mixture of 138 parts of salicylic acid and of 184 parts of chlorcarvacrol are heated up to 105° C. and at this temperature 52 parts of phosphor-oxychloride are slowly added. To complete the reaction I heat for several hours at 110–115° C. and allow then to cool off.

The reaction product is entered into cold water and rendered alkaline with sodium carbonate. The segregated salicylic acid-chlorcarvacrolester is crystallized out of alcohol; it forms white crystals of m. p. 60–61° C.

What I claim is:

1. The method of making a bactericide for internal use from a halogen substitution compound of carvacrol, said method consisting in acting upon the halogen compound with the chloride of an acid containing the group —COOH.

2. The method of making chlorcarvacrol-carbonate, said method consisting in dissolving chlorcarvacrol in sodium hydroxide solution, introducing phosgene into the reaction mixture until it shows a weak acid reaction, and separating the chlorcarvacrol-carbonate from the mother liquor.

3. The method of making salicylic acid chlorcarvacrol ester, said method consisting of mixing salicylic acid and chlorcarvacrol, heating said mixture to substantially the boiling point of water, adding phosphor-oxychloride to the reaction mixture, continuing heating the said mixture at an elevated temperature, entering the cooled reaction products into water, and adding an alkaline reacting substance until the said mixture shows an alkaline reaction.

4. A bactericide for internal use, said bactericide consisting of the carbonate of a halogen substitution compound of carvacrol.

5. A bactericide for internal use, said bactericide consisting of the carbonate of a chlorine substitution compound of carvacrol.

6. Chlorcarvacrolcarbonate, being a solid crystallizing out of dilute alcohol in the form of white crystals of m. p. 83–84° C.

7. Salicylic acid chlorcarvacrolester, being a solid crystallizing out of alcohol in the form of white crystals of m. p. 60–61° C.

8. A bactericide for internal use, said bactericide consisting of the ester of a chlorine derivative of carvacrol with an acid containing a —COOH group.

CURT PHILIPP.